United States Patent Office 3,419,547
Patented Dec. 31, 1968

3,419,547
CERTAIN 10-BASICALLY SUBSTITUTED-5H-DI-BENZO[b,e,][1,4]DIAZEPINE COMPOUNDS
Jean Schmutz, Muri, near Bern, and Fritz Hunziker, Bern, Switzerland, assignors to Dr. A. Wander, S.A., Bern, Switzerland, a corporation of Switzerland
No Drawing. Continuation-in-part of application Ser. No. 57,141, Sept. 20, 1960. This application Feb. 5, 1962, Ser. No. 171,245
Claims priority, application Switzerland, Sept. 22, 1959, 78,518
21 Claims. (Cl. 260—239.3)

This application is a continuation-in-part application of applicants' co-pending application Ser. No. 57,141, filed Sept. 20, 1960, now abandoned.

This invention relates to novel heterocyclic nitrogen-containing compounds and a method of producing the same.

We have found that valuable therapeutic agents comprising certain basic substituted 5H-dibenzo[b,e][1,4]diazepine compounds can be obtained by introducing a tertiary aminoalkyl group into the corresponding unsubstituted 5H-dibenzo[b,e][1,4]diazepines. Our new compounds are characterized by the inclusion of a basic side chain or substituent on the 10-nitrogen atom of the $C_5N_2$ ring.

The starting materials to be used in accordance with the present invention are represented by the following Formula I

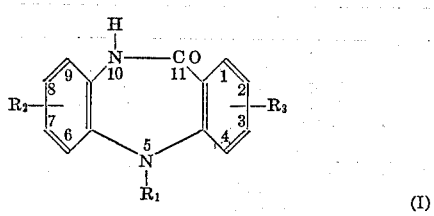

(I)

and the basic substituted 5H-dibenzo[b,e][1,4]diazepine compounds obtained from Formula I, in accordance with the present invention, are represented by the following Formula II

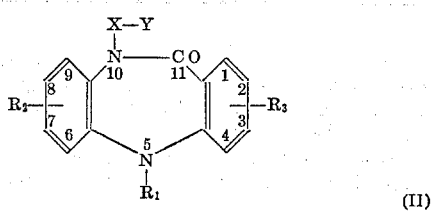

(II)

In the Formulas I and II the letter symbols have the following meanings: $R_1$ represents hydrogen, methyl or ethyl; —X—Y represents a basic radical wherein X is a normal or branched hydrocarbon chain containing between 2 and 3 inclusive carbon atoms (preferably, an ethyl, propyl or isopropyl chain), and Y is a dialkylamino group having between 2 and 4 inclusive carbon atoms (preferably, dimethylamino or diethylamino), a 5- and a 6-membered cycloalkylamino group (preferably, piperidino or pyrrolidino), or a 6-membered cycloalkylamino group wherein one —$CH_2$— group thereof is replaced by a member of the class consisting of —O—, —NH—,

—N($CH_3$)—

—N($CH_2$—$CH_3$)—, —N($CH_2$—$CH_2$—OH)— and

—N($CH_2$—$CH_2$—O—$CH_3$)—

(preferably, morpholino, N'-methylpiperazino or N'-ethylpiperazino); and $R_2$ and $R_3$ are hydrogen, chlorine, methyl, ethyl, methoxy, ethoxy, trifluormethyl, methylmercapto, or ethylmercapto.

The introduction of the basic radical —X—Y in place of a hydrogen in the 10-position in compounds of the type represented by Formula I to obtain the compounds of Formula II may be effected in several ways of which the following techniques are exemplary:

(a) The Formula I compound may be reacted with an ester of a tertiary aminoalkanol having the formula Z—X—Y wherein X and Y have the meanings described above and Z represents an acid radical, particularly the radical of a strong inorganic or organic acid such as a hydrohalogen acid or an organic sulfonic acid. This reaction is preferably carried out by prior or concurrent metallization of the Formula I compound using a suitable condensation agent, particularly the alkali metals, their hydrides, amides, or other organic alkali metal compounds, e.g. sodium amide, sodium hydride, phenyl sodium, or tertiary butyl sodium.

(b) The introduction of the basic radical —X—Y into the Formula I compound may also take place in two steps. First, a halogen alkyl group of the formula —X—Hal is introduced into the Formula I compound at the 10-position, e.g. by reaction with an ester of the corresponding halogen alkanol having the formula Z—X—Hal where Hal represents halogen and Z and X have the meanings described above, or by reaction with an alkylene oxide followed by esterification with a hydrohalogen acid. Second, the resulting halogen compound from the first step is reacted with a secondary amine of the formula H—Y or a corresponding tertiary derivative where Y has the meaning described above.

If the starting material of Formula I has a hydrogen atom in both the 5- and the 10-positions, the resultant compound having the Formula II will comprise an unsubstituted nitrogen atom in the 5-position. Thus, in the case of a starting material of the Formula I having hydrogen at both the 5- and 10-positions, it has been unexpectedly found that the basic radical —X—Y is introduced into the 10-position leaving the 5-position unsubstituted and available for subsequent alkylation. The latter compound may be subsequently alkylated by any convenient method, e.g. by a condensation technique similar to (a) above, wherein the 5- unsubstituted diazepine compound is reacted with an ester of the formula $R_1$—Z wherein $R_1$ is the desired alkyl substituent and Z has the meaning already described.

The starting materials having the Formula I can be obtained by effecting ring closure or cyclization of the corresponding N-alkyl-2-amino-diphenylamine-2'-carboxylic acids or alkyl esters thereof.

The compounds of the Formula II type are strong bases which may readily be converted to water soluble, pharmaceutically active, non-toxic salts. For example, suitable inorganic acid addition salts include the hydrochlorides, hydrobromides, sulfates, nitrates, and phosphates. Suitable organic acid salts may also be formed, e.g. the acetates, oxalates, malonates, succinates, malates, maleates, tartrates, or toluene sulfonates.

The non-toxic mono- and di-quaternary ammonium salt derivatives are also therapeutically useful, such derivatives being obtained, for example, by reacting the bases with a quaternizing agent such as dialkylsulfate, an alkyl halide, or a sulfonic acid alkyl ester. Inorganic and organic acid salts of the mono- and di-quaternary salts may also be formed as described above. The quaternary ammonium derivatives of the Formula II compounds may also be obtained by introducing into the Formula I starting materials a quaternary ammonium derivative of the tertiary aminoalkyl radical —X—Y instead of the radical —X—Y per se.

The Formula II compounds of the present invention, including the bases per se as well as their quaternary ammonium derivatives and the acid addition salts of the same, are useful as antihistamines, analgesics, spasmolytics, anti-Parkinson agents, tranquilizers, and psychic energizers, thymoleptics or psycho stimulants. The usual dosage unit forms of therapeutic administration may be employed. For example, the active substance may be composited with a suitable pharmaceutical carrier to provide solutions, syrups, spray compositions, tablets, capsules, suppositories, powders, or the like.

For the manufacture of tablets, the products of the present invention, preferably in the form of the hydrochlorides or of the maleates, can be mixed with lactose and granulated with water, 0.5% sodium alginate solution or 1% gelatin solution. The dried granulate can be compressed into tablets in the presence of about 5% of talcum, 5% of corn starch and 0.1% magnesium stearate. In this way, there are obtained, for example, tablets of the following composition, tablets (a) and (b) showing antihistaminic, and tablets (c) thymoleptic activity:

(a)

| | Mg. |
|---|---|
| 7 - chloro - 10-β-dimethylamino-ethyl-10,11-dihydro-11-oxo-5H-dibenzo[b,e][1,4]diazepine | 5 |
| Lactose | 175 |
| Corn starch | 10 |
| Talcum | 10 |
| Magnesium stearate | 0.2 |

Tablet weight: 0.200 gm.

(b)

| | |
|---|---|
| 5 - methyl-7-chloro-10-β-dimethylamino-ethyl-10,11-dihydro - 11 - oxo-5H-dibenzo[b,e][1,4]diazepine hydrochloride | 10 |
| Lactose | 144 |
| Corn starch | 8 |
| Talcum | 8 |
| Magnesium stearate | 0.2 |

Tablet weight: 0.170 gm.

(c)

| | |
|---|---|
| 5 - methyl-10-β-dimethylamino-ethyl-10,11-dihydro-11-oxo-5H-dibenzo[b,e][1,4]diazepine maleate | 15 |
| Lactose | 147 |
| Corn starch | 9 |
| Talcum | 9 |
| Magnesium stearate | 0.2 |

Tablet weight: 0.180 gm.

Injectable solutions are obtained, for example, by dissolving in bidistilled water the products of the present invention in the form of their hydrochlorides or other salts, and by adding sodium chloride or glucose until isotonic concentration is reached. The solutions are filtered free of germs, filled into ampoules and sterilized for 30 minutes at 120° C. in the autoclave. In this way, there are obtained, for example, injectable solutions of the following composition, having antihistaminic activity:

(a)

| | Mg. |
|---|---|
| 7 - chloro-10-β-dimethylamino-ethyl-10,11-dihydro-11 - oxo - 5H - dibenzo[b,e][1,4]diazepine hydrochloride | 5 |
| Sodium chloride | 40.5 |
| Bidistilled water, up to 5 ml. | |

(b)

| | |
|---|---|
| 7 - chloro - 10-β-pyrrolidino-ethyl-10,11-dihydro-11-oxo-5H-dibenzo[b,e][1,4]diazepine maleate | 10 |
| Sodium chloride | 41 |
| Bidistilled water, up to 5 ml. | |

Suppositories are obtained, for example, by grinding to a fine powder the products of the present invention in the form of bases or salts, by mixing intimately with a molten suppository mass (e.g. Oleum Cacao, Witten mass and the like) if necessary in the presence of paraffin oil, by pouring the mixture into moulds and by allowing to cool at low temperature. In this way, there are obtained, for example, suppositories of the following composition, having antihistaminic (a) and thymoleptic (b) activity:

(a)

| | Mg. |
|---|---|
| 7 - chloro - 10-β-dimethylamino-ethyl-10,11-dihydro-11-oxo-5H-dibenzo[b,e][1,4]diazepine | 5 |
| Oleum Cacao | 300 |

(b)

| | |
|---|---|
| 5 - methyl - 10 - γ-dimethylamino-propyl-10,11-dihydro - 11 - oxo - 5H - dibenzo[b,e][1,4]diazepine maleate | 10 |
| Paraffin oil | 90 |
| Oleum Cacao | 210 |

The following Table I shows the doses of exemplary compounds which are effective in preventing asphyxia in 50% of the test animals (ED 50) exposed to histamine aerosol, in mg./kg. per os.

TABLE I

| Compound administered | | | ED 50 mg./kg. per os |
|---|---|---|---|
| —X—Y | $R_1$ | $R_2, R_3$ | |
| —CH$_2$—CH$_2$—N(CH$_3$)$_2$ | H | H | 4.4 |
| —CH$_2$—CH$_2$—N(CH$_3$)$_2$ | —CH$_3$ | H | 14 |
| —CH$_2$—CH$_2$—N(CH$_3$)$_2$ | —CH$_3$ | 7-Cl | 0.55 |
| —CH$_2$—CH$_2$—N(CH$_3$)$_2$ | —CH$_3$ | 8-Cl | 8.8 |
| —CH$_2$—CH$_2$—N(CH$_3$)$_2$ | H | 7-Cl | 0.15 |
| —CH$_2$—CH$_2$—N(pyrrolidino) | H | 7-Cl | 0.5 |
| —CH$_2$—CH$_2$—N(piperidino) | H | 7-Cl | 4.6 |
| —CH$_2$—CH$_2$—N(CH$_3$)$_2$ | H | 3-Cl | 2.8 |
| —CH$_2$—CH$_2$—CH$_2$—N(CH$_3$)$_2$ | H | 7-Cl | 3.5 |
| —CH$_2$—CH$_2$—N(CH$_3$)$_2$ | H | 8-CH$_3$ | 4 |
| —CH$_2$—CH$_2$—N(CH$_3$)$_2$ | —CH$_3$ | 8-CH$_3$ | 2.9 |

The following Table II shows the analgesic effect of exemplary compounds in rabbits. The dental pulp of the test animal is electrically irritated until pain reaction occurs. The intensity of current in μa., which is necessary to evoke a pain reaction in the untreated animal (control) being 100%, the last column gives the percentage of current necessary for animals, to which 1/7 of the LD 50 (dose which is lethal for 50% of the animals) has been administered by mouth.

TABLE II

| Compound administered | | | Current intensity, percent of control |
|---|---|---|---|
| —X—Y | $R_1$ | $R_2, R_3$ | |
| —CH$_2$—CH$_2$—N(CH$_3$)$_2$ | —CH$_3$ | H | 197 |
| —CH$_2$—CH$_2$—N(pyrrolidino) | —CH$_3$ | H | 234 |
| —CH$_2$—CH$_2$—N(piperidino) | —CH$_3$ | H | 420 |
| —CH$_2$—CH$_2$—CH$_2$—N(piperidino) | —CH$_3$ | H | 230 |
| —CH$_2$—CH$_2$—CH$_2$—N(morpholino) | —CH$_3$ | H | 295 |

The following non-limiting specific examples will further illustrate the products and processes of the present invention:

EXAMPLE 1

6.31 g. (0.03 mol) of 11-hydroxy-5H-dibenzo[b,e,][1,4]diazepine were boiled for 1 hour with 1.40 g. (0.036 mol) of powdered sodium amide in 50 ml. of absolute dioxane. After adding a concentrated benzenic solution of 0.039 mol of β-dimethylaminoethyl chloride, which had been freshly prepared by decomposing an equivalent quantity (5.62 g.) of the hydrochloride with concentrated sodium hydroxide solution, taking up in benzene and drying the solution with potash, the mixture was boiled for 16 hours under reflux, whereupon the reaction mixture was concentrated to dryness and the residue distributed between ether and water. By exhaustive extraction of the basic fractions with dilute acetic acid, precipitation with ammonia, taking up the base in ether and working up the ethereal solution, there were obtained 6.75 g. (80% of the theoretical) of 10-β-dimethylaminoethyl - 10,11 - dihydro - 11-oxo-5H-dibenzo[b,e][1,4]diazepine with a boiling point of about 210° C./0.05 mm. Hg, which could be crystallized from ether-petroleum ether (1:4) in the form of granules with the melting point 112 to 114° C.

EXAMPLE 2

From 6.31 g. of the same starting material as in Example 1, there were obtained with the corresponding quantity of γ-dimethylaminopropyl chloride, using the same procedure as in Example 1, 7.74 g. (87% of the theoretical) of crude 10-γ-dimethylaminopropyl-10,11-dihydro-11-oxo-5H-dibenzo[b,e][1,4]diazepine as a yellowish viscous resin.

By reacting the crude resin with an equimolar quantity of hydrochloric acid in methanol, evaporating the solvent and recrystallizing from methanol-ether (1:3), the hydrochloride was obtained with a melting point 222 to 226° C.

EXAMPLE 3

Using the same procedure as in Example 1, there were obtained from 4.48 g. of 5-methyl-11-hydroxy-5H-dibenzo[b,e][1,4]diazepine and 0.86 g. of sodium amide, on the one hand, and from a solution of β-dimethylaminoethyl chloride freshly prepared from 3.75 g. of the hydrochloride, on the other hand, 5.05 g. (85% of the theoretical) of 5-methyl-10-β-dimethylaminoethyl-10,11-dihydro-11-oxo-5H-dibenzo[b,e][1,4]diazepine in the form of a viscous yellowish resin with the boiling point 185° C./0.01 mm. Hg. The base was crystallized from acetone-petroleum ether, melting point 116–117° C. Melting point of the monohydrochloride (from ethanol-ether) 234–240° C.

EXAMPLE 4

Using the same procedure as in Example 3, and employing 6.72 g. of the same diazepine as well as a corresponding quantity of γ-dimethylaminopropyl chloride, there were obtained 6.95 g. (75% of the theoretical) of 5 - methyl - 10 - γ - dimethylaminopropyl - 10,11 - dihydro-11-oxo-5H-dibenzo[b,e][1,4]diazepine as a viscous, yellowish resin with the boiling point 205° C./0.05 mm. Hg. The base was crystallized from ether-petroleum ether, melting point 75–78° C.

EXAMPLE 5

Using the same procedure as in Example 1, there were obtained from 11 g. of 8-chloro-11-hydroxy-5H-dibenzo[b,e][1,4]diazepine and 2.05 g. of sodium amide in 100 ml. of absolute dioxane on the one hand, and a benzenic solution of β-dimethylaminoethyl chloride freshly prepared from 8.4 g. of the hydrochloride, on the other hand, 10.58 g. (74% of the theoretical) of 8-chloro-10-β-dimethylaminoethyl - 10,11 - dihydro - 11 - oxo - 5H - dibenzo[b,e][1,4]diazepine in the form of coarse, reddish granules with the melting point of 144 to 145° C. (from ether-petroleum ether 1:4).

EXAMPLE 6

Using the same procedure as in Example 5, and using 9.79 g. of the same diazepine as well as a corresponding quantity of γ-dimethylaminopropyl chloride, there were obtained 13.11 g. (almost 100% of the theoretical) of crude 8 - chloro - 10 - γ - dimethylaminopropyl - 10,11-dihydro - 11 - oxo - 5H - dibenzo[b,e][1,4]diazepine in the form of a viscous red resin.

By reacting the crude base with an equivalent quantity of hydrochloric acid in methanol, evaporating the solvent and recrystallizing the dry residue from methanol-ether 1:3, the hydrochloride was obtained in the form of reddish, lustrous granules, melting point of 249–251° C.

EXAMPLE 7

Using the same procedure as in Example 1, and from 8.60 g. of 5-methyl-8-chloro-11-hydroxy-5H-dibenzo[b,e][1,4]diazepine and 1.6 g. of sodium amide in 50 ml. of absolute dioxane on the one hand, and a benzenic solution of β-dimethylaminoethyl chloride freshly prepared from 6.8 g. of the hydrochloride, on the other hand, there were obtained 10.5 g. (almost 100% of the theoretical) of crude 5 - methyl - 8 - chloro - 10 - β - dimethylaminoethyl - 10,11-dihydro-11-oxo-5H-dibenzo[b,e][1,4]diazepine in the form of a reddish, viscous resin, which had a boiling point of about 190° C./0.05 mm. Hg and which could only be distilled with considerable decomposition.

By reacting the crude base with an equivalent quantity of hydrochloric acid in methanol, evaporating the solvent and recrystallizing the dry residue from methanol-ether 1:3, the hydrochloride was obtained in the form of solid, lustrous granules with the melting point of 240 to 245° C.

EXAMPLE 8

Using the same procedure as in Example 7 and using 5.60 g. of the same diazepine as well as a corresponding quantity of γ-dimethylaminopropyl chloride, there were obtained 6.35 g. (85% of the theoretical) of 5-methyl-8-chloro - 10 - γ - dimethylaminopropyl - 10,11 - diyhdro-11-oxo-5H-dibenzo[b,e][1,4]diazepine as a yellowish, viscous resin with a boiling point of 192 to 193° C./0.01 mm. Hg.

By reacting the crude base with an equivalent quantity of hydrochloric acid in methanol, evaporating the solvent and recrystallizing the dry residue from acetone-ether 1:3, the hydrochloride was obtained with a melting point 193 to 197° C.

EXAMPLE 9

1.23 gm. of 5-methyl-10-β-dimethylaminoethyl-10,11-dihydro-11-oxo-5H-dibenzo[b,e][1,4]diazepine (prepared as in Example 3) was dissolved in 20 ml. of benzene and an equimolar quantity of dimethyl sulfate was added. After letting stand overnight, the crystalline precipitate was removed by suction, washed with benzene and recrystallized from methanol-ether. There was obtained 1.18 gm. of metho-sulfate with a melting point of 180°–185° C.

EXAMPLES 10–47

Following the procedure of the preceding examples, the compounds listed in the following Table III were obtained from the corresponding starting materials. In this table, $R_1$, $R_2$, $R_3$ and —X—Y are the corresponding groups of the products Formula II:

TABLE III

| Ex. No. | -X-Y | R₁ | R₂, R₃ | Melting point (M.P.) or boiling point (B.P.) of the base | Melting point of the salt | Yield of base (percent of the theoretical) |
|---|---|---|---|---|---|---|
| 10 | -CH₂-CH₂-N(piperidino) | -CH₃ | H | B.P. 201-203° C./0.02 mm. Hg | HCl: 140-153° C.[1] | 72 |
| 11 | -CH₂-CH₂-N(morpholino) | -CH₃ | H | B.P. 211-213° C./0.007 mm. Hg | HCl: 140-153° C.[1] | 58 |
| 12 | -CH₂-CH₂-N(pyrrolidino) | -CH₃ | H | B.P. 206-207° C./0.005 mm. Hg | HCl: 100-105° C.[1] | 68 |
| 13 | -CH₂-CH₂-N(N-methylpiperazino)-CH₃ | -CH₃ | H | B.P. 220° C./0.02 mm. Hg | 2 HCl: 185-190° C.[3] | 64 |
| 14 | -CH₂-CH₂-N(C₂H₅)₂ | -CH₃ | H | B.P. 186-187° C./0.01 mm. Hg | | 88 |
| 15 | -CH₂-CH₂-CH₂-N(morpholino) | -CH₃ | H | M.P. 115-120° C | | 54 |
| 16 | -CH₂-CH₂-CH₂-N(piperidino) | -CH₃ | H | M.P. 94-96° C | | 83 |
| 17 | -CH₂-CH₂-CH₂-N(4-methylpiperidino)-CH₃ | -CH₃ | H | B.P. 210-212° C./0.01 mm. Hg | 2 HCl: 150-160° C.[1] | 53 |
| 18 | -CH₂-CH₂-N(N-methylpiperidino) | -CH₃ | H | B.P. 215-220° C./0.01 mm. Hg | | 93 |
| 19 | -CH₂-CH₂-N(piperazino)N-CH₂-CH₂OH | -CH₃ | H |  | 2 HCl: >60° C.[2] | 53 |
| 20 | -CH₂-CH₂-CH₂-N(piperazino)N-CH₂-CH₂OH | -CH₃ | H | M.P. (Dihydrate) >60° C.[2] | | 61 |
| 21 | -CH₂-CH₂-N(piperidino) | H | H | M.P. 136-137° C | | 80 |
| 22 | -CH₂-CH₂-N(morpholino) | H | H | M.P. 116-118° C | | 56 |
| 23 | -CH₂-CH₂-CH₂-N(piperidino) | H | H | B.P. 222-223° C./0.01 mm. Hg | | 85 |
| 24 | -CH₂-CH₂-N(N-methylpiperidino) | H | H | B.P. 225-226° C./0.03 mm. Hg | | 74 |
| 25 | -CH₂-CH₂-N(CH₃)₂ | H | 7-Cl | M.P. 164-165° C | | 85 |
| 26 | -CH₂-CH₂-N(CH₃)₂ | H | 8-OCH₃ | M.P. 126-127° C | HCl: 226-232° C | 84 |
| 27 | -CH₂-CH₂-CH₂-N(CH₃)₂ | H | 8-OCH₃ | B.P. 216° C./0.02 mm. Hg | HCl: 184-186° C | 75 |
| 28 | -CH₂-CH₂-N(CH₃)₂ | H | 8-CH₃ | M.P. 108-110° C | | 82 |
| 29 | -CH₂-CH₂-N(CH₃)₂ | H | 3-Cl | M.P. 142-144° C | | 83 |
| 30 | -CH₂-CH₂-N(CH₃)₂ | -CH₃ | 7-Cl | B.P. 179-180° C./0.05 mm. Hg | HCl: 250-253° C | 99 |
| 31 | -CH₂-CH₂-N(CH₃)₂ | -CH₃ | 2-OCH₃ | B.P. 201-202° C./0.04 mm. Hg | HCl: 207-210° C | 91 |
| 32 | -CH₂-CH₂-N(CH₃)₂ | -CH₃ | 8-OCH₃ | B.P. 204-206° C./0.02 mm. Hg | HCl: 213-215° C | 89 |
| 33 | -CH₂-CH₂-N(CH₃)₂ | -CH₃ | 8-CH₃ | B.P. 193-195° C./0.02 mm. Hg | HCl: 220-222° C | 90 |
| 34 | -CH₂-CH₂-N(CH₃)₂ | H | 8-CH₃ | M.P. 137-138° C | | 80 |
| 35 | -CH₂-CH(CH₃)-N(CH₃)₂ | H | 7-Cl | M.P. 197-199° C | | 70 |
| 36 | -CH₂-CH₂-CH₂-N(CH₃)₂ | H | 3-Cl | M.P. 142-143° C | | 80 |
| 37 | -CH₂-CH₂-CH₂-N(CH₃)₂ | H | 7-Cl | M.P. 137-139° C | | 68 |
| 38 | -CH₂-CH₂-N(pyrrolidino) | H | 7-Cl | M.P. 159-160° C | | 74 |
| 39 | -CH₂-CH₂-N(piperidino) | H | 7-Cl | M.P. 187-189° C | | 66 |
| 40 | -CH₂-CH₂-N(morpholino) | H | 7-Cl | M.P. 220-222° C | | 50 |
| 41 | -CH₂-CH₂-CH₂-N(CH₃)₂ | -CH₃ | 8-CH₃ | M.P. 78-80° C | | 91 |
| 42 | -CH₂-CH₂-N(CH₃)₂ | H | 3-OCH₃ | M.P. 141-143° C | | 81 |
| 43 | -CH₂-CH₂-N(CH₃)₂ | H | 8-CF₃ | M.P. 115-118° C | | 90 |
| 44 | -CH₂-CH₂-N(CH₃)₂ | H | 2-Cl | M.P. 172-173.5° C | | 82 |
| 45 | -CH₂-CH₂-N(CH₃)₂ | -CH₃ | 8-CF₃ |  | HCl: 222-226° C.[3] | 90 |
| 46 | -CH₂-CH₂-N(CH₃)₂ | -CH₃ | 7-SCH₃ |  | HCl: 205-207° C | 81 |
| 47 | -CH₂-CH₂-N(CH₃)₂ | H | 7-SCH₃ | M.P. 126-129° C | | 60 |

[1] Not free from solvent.
[2] Hygroscopic.
[3] Decomposition.

We claim:
1. A compound selected from the group consisting of: (A) the substituted 5H-dibenzo[b,e][1,4]diazepine derivatives of the formula

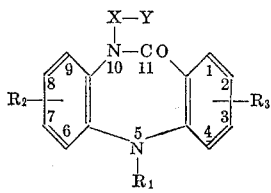

wherein $R_1$ is selected from the class consisting of hydrogen, methyl and ethyl; —X—Y is a basic radical wherein X is a hydrocarbon chain containing between 2 and 3 inclusive carbon atoms, and Y is selected from the class consisting of dialkylamino having between 2 and 4 inclusive carbon atoms, piperidino, pyrrolidino, N-(lower alkyl)-2-piperidyl, morpholino, 1-piperazinyl, 4-(lower alkyl)-1-piperazinyl, 4-(hydroxy-lower alkyl)-1-piperazinyl, and 4-(methoxy-lower alkyl)-1-piperazinyl and $R_2$ and $R_3$ are selected from the class consisting of hydrogen, chlorine, methyl, ethyl, methoxy, ethoxy, trifluormethyl, methylmercapto, and ethylmercapto; (B) the non-toxic therapeutically useful quaternary ammonium salts of (A); and (C) the non-toxic therapeutically useful acid addition salts of (A) and (B).

2. 7 - chloro - 10 - $\beta$ - dimethylaminoethyl - 10,11-dihydro-11-oxo-5H-dibenzo[b,e][1,4]diazepine.

3. A non-toxic, water soluble acid addition salt of 7-chloro - 10 - $\beta$ - dimethylaminoethyl - 10,11 - dihydro-11-oxo-5H-dibenzo[b,e][1,4]diazepine.

4. 5 - methyl - 7 - chloro - 10 - $\beta$ - dimethylaminoethyl-10,11-dihydro-11-oxo-5H-dibenzo[b,e][1,4]diazepine.

5. A non-toxic, water soluble acid solution salt of 5-methyl - 7 - chloro - 10 - $\beta$ - dimethylaminoethyl - 10,11-dihydro-11-oxo-5H-dibenzo[b,e][1,4]diazepine.

6. 7 - chloro - 10 - $\beta$ - pyrrolidinoethyl - 10,11 - dihydro-11-oxo-5H-dibenzo[b,e][1,4]diazepine.

7. A non-toxic, water soluble acid addition salt of 7-chloro - 10 - $\beta$ - pyrrolidinoethyl - 10,11 - dihydro - 11-oxo-5H-dibenzo[b,e][1,4]diazepine.

8. 3 - chloro - 10 - $\beta$ - dimethylaminoethyl - 10,11 - dihydro-11-oxo-5H-dibenzo[b,e][1,4]diazepine.

9. A non-toxic, water soluble acid addition salt of 3-chloro - 10 - $\beta$ - dimethylaminoethyl - 10,11 - dihydro-11-oxo-5H-dibenzo[b,e][1,4]diazepine.

10. 10 - $\beta$ - dimethylaminoethyl - 10,11 - dihydro - 11-oxo-5H-dibenzo[b,e][1,4]diazepine.

11. 8-chloro - 10-$\beta$-dimethylaminoethyl-10,11-dihydro-11-oxo-5H-dibenzyl[b,e][1,4]diazepine.

12. 5 - methyl - 10 - $\beta$ - pyrrolidino - ethyl - 10,11-dihydro-11-oxo-5H-dibenzo[b,e][1,4]diazepine.

13. 5 - methyl - 10 - $\beta$ - N - methyl - piperazino - ethyl-10,11-dihydro-11-oxo-5H-dibenzo[b,e][1,4]diazepine.

14. 5 - methyl - 10 - $\beta$ - dimethylamino - ethyl - 10,11-dihydro-11-oxo-5H-dibenzo[b,e][1,4]diazepine.

15. A non-toxic, water soluble acid addition salt of 5-methyl - 10 - $\beta$ - dimethylamino - ethyl - 10,11 - dihydro-11-oxo-5H-dibenzo[b,e][1,4]diazepine.

16. 5 - methyl - 10 - $\gamma$ - dimethylamino - propyl - 10,11-dihydro-11-oxo-5H-dibenzo[b,e][1,4]diazepine.

17. 5 - methyl - 10 - $\gamma$ - N - methyl - piperazino-propyl - 10,11 - dihydro - 11 - oxo-5H-dibenzo[b,e][1,4]diazepine.

18. 5 - methyl - 10 - $\beta$ - morpholino - ethyl - 10,11-dihydro-11-oxo-5H-dibenzo[b,e][1,4]diazepine.

19. 5 - methyl - 10 - $\beta$ - piperidino - ethyl - 10,11 - dihydro-11-oxo-5H-dibenzo[b,e][1,4]diazepine.

20. A compound of the formula:

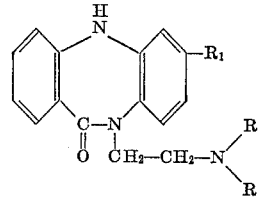

wherein R is a member selected from the group consisting of $CH_3$ and $C_2H_5$, and $R_1$ is a member selected from the group consisting of Cl, $CF_3$, $CH_3$, and $C_2H_5$.

21. A compound of the formula

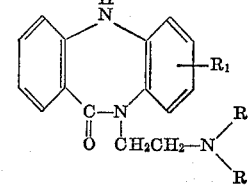

wherein R is a member selected from the group consisting of $CH_3$ and $C_2H_5$, and $R_1$ is a member selected from the group consisting of H, Cl, $CF_3$, $CH_3$, and $C_2H_5$.

References Cited
UNITED STATES PATENTS 2,852,510  9/1958  Hoffmann et al. _____ 260—327

ALTON D. ROLLINS, *Primary Examiner.*

U.S. Cl. X.R.

167—65

UNITED STATES PATENT OFFICE
CERTIFICATE OF CORRECTION

Patent No. 3,419,547                         December 31, 1968

Jean Schmutz et al.

It is certified that error appears in the above identified patent and that said Letters Patent are hereby corrected as shown below:

Columns 7 and 8, TABLE III, first column, line 8 thereof, the formula should appear as shown below:

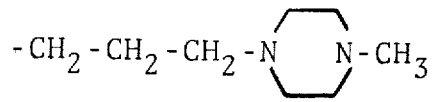

Column 9, line 54, "dibenzyl" should read -- dibenzo --.

Signed and sealed this 24th day of March 1970.

(SEAL)
Attest:

Edward M. Fletcher, Jr.               WILLIAM E. SCHUYLER, JR.
Attesting Officer                           Commissioner of Patents